Dec. 12, 1967     S. GROSU     3,358,165
THREE-PHASE ELECTRIC MOTORS

Filed Dec. 30, 1964

INVENTOR
*STEFAN GROSU*
BY *Arthur O. Klein*
ATTORNEY

United States Patent Office 3,358,165
Patented Dec. 12, 1967

3,358,165
THREE-PHASE ELECTRIC MOTORS
Stefan Grosu, Bucharest, Rumania, assignor to Ministerul Industriei Constructiilor de Masini, Bucharest, Rumania
Filed Dec. 30, 1964, Ser. No. 422,249
4 Claims. (Cl. 310—185)

ABSTRACT OF THE DISCLOSURE

A simply constructed, economical three-phase electric motor has been devised. The stator of the motor includes an elongated, laminated, magnetic core having three parallel legs extending partially along the core. The legs are individually provided with surrounding coils arranged to form a three-phase winding. The portion of the core longitudinally remote from the legs is provided with a circular aperture extending perpendicularly through the core. The center of the circular aperture is aligned with the intermediate leg for receiving a rotor. The magnetic lines of force passing through the rotor when the winding is excited includes a component which effects rotation of the rotor.

---

The present invention refers to motors for three-phase alternating current, asynchronous or synchronous, for special uses, and leads above all to an important constructive simplification of the motors.

The stator of the conventional three-phase motors consists of a magnetic core which has the shape of a cylindrical ring, provided with slots inside which are placed the coils of the winding, supplied with current by the three-phase network. The rotor, which may be provided with a winding or not, is surrounded by the stator.

The design is relatively complicated and involves a high cost price.

According to the invention, the stator has the shape of an elongated magnetic core made up of laminated, superposed steel sheets, and include first and second longitudinally adjacent portions. The first portion includes three parallel legs extending partially along the core. The second portion is provided with a central aperture which extends completely through the core in a direction perpendicular thereto. The center of the circular aperture is in alignment with the intermediate leg on the first portion. The rotor is rotatably mounted in the circular aperture. Each leg has a separate coil individually wound thereon, and the coils are separately fed from a three-phase power source.

The nature of the invention and its advantages are set forth more fully in the following description of an illustrative embodiment thereof when taken in connection with the appended drawing, in which.

Figure 1:
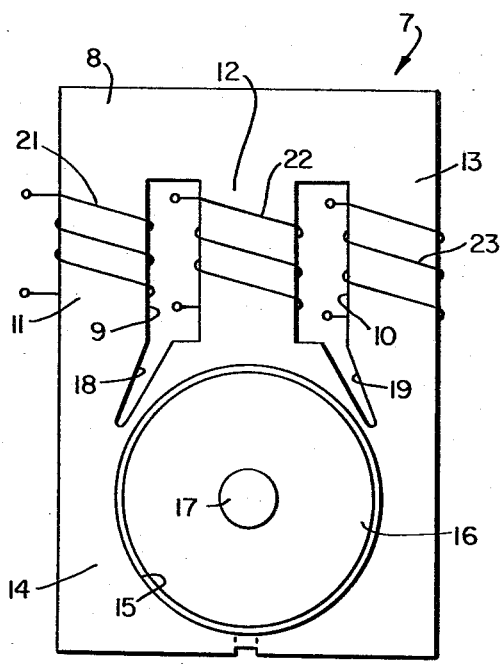
FIG. 1 is a front view of an illustrative three-phase motor constructed in accordance with the invention.
Figure 2:
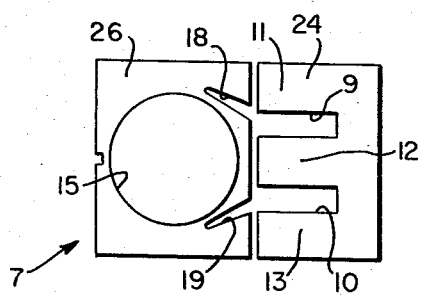
FIG. 2 is a first yoke arrangement for the stator of the motor of FIG. 1.
Figure 3:
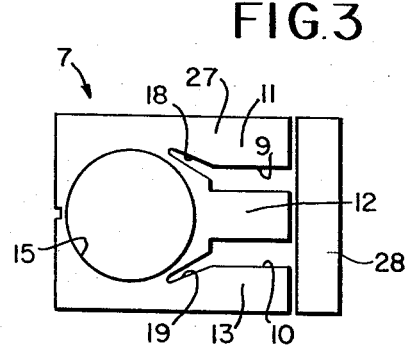
FIG. 3 is a second yoke arrangement for the stator of the motor of FIG. 1.

In the embodiment in FIGS. 1–3, the three-phase motor depicted includes a stator formed from an elongated, laminated magnetic core 7. An upper portion 8 of the core is provided with a pair of transversely spaced substantially rectangular slots 9 and 10 which are bounded on their longer sides by three parallel legs 11, 12, and 13. A lower portion 14 of the core is provided with a circular aperture 15, which extends through all the laminations of the core in a direction perpendicular thereto. The center of the aperture 15 is aligned with the intermediate leg 12. A rotor 16, carried by a central shaft 17, is suitably mounted for rotation by means not shown, within the aperture 15.

The slots 9 and 10 are respectively provided with downwardly and outwardly extending projections 18 and 19 for the purpose of concentrating magnetic lines of force toward the rotor 16.

A plurality of coils 21, 22 and 23 are respectively wound around the upper portions of the legs 11, 12 and 13. The coils 21–23 are individually connected to the separate phases of a suitable three-phase Y or delta network (not shown) in a manner well known to those skilled in the art.

When power is applied to the coils 21–23 from an external three-phase source, the total downwardly directed magnetic lines of force in one of the legs 11–13 will, at any instant of time, be equal to the sum of the upwardly directed lines of force in the other two legs. Thus, since the rotor 16 is linked to the longitudinal flux on all three legs 11–13, a component of this flux will tend to rotate the rotor 16 and, therefore, cause the desired motor action.

The core 7 may be physically constructed in several different ways. In FIG. 2, for example, in which elements corresponding to FIG. 1 have been given corresponding reference numerals, the core 7 is formed from two laminated yokes 24 and 26 of unequal size. The smaller yoke 24, of generally E-shaped cross section, defines the three sides of the respective slots 9 and 10 forming the stator legs 11–13. The larger yoke 26, of generally I-shaped cross section, contains the aperture 15. The extensions 18 and 19 of the slots 9 and 10 are physically disposed in the larger yoke 26.

An alternative construction of the magnetic core 7 is shown in FIG. 3, wherein a relatively large yoke 27, of generally E-shaped cross section, contains the aperture 15, the extensions 18 and 19, and the three sides of the rectangular slots 9 and 10 that form the legs 11–13. The remaining sides of the slots 9 and 10 are bounded by a smaller yoke 28 of I-shaped cross section.

The motor of the invention has a stator core which is smaller, lighter and simpler to construct than prior art designs. Additionally, the three-phase winding is more easily insulated and mounted.

Another advantage of the resulting arrangement is that the coils 21–23 are longitudinally spaced by a significant distance from the rotor 16.

The coils may be immersed in one medium, as for instance air, while the rotor is in a different medium, for instance, in water. A partition may be provided between the rotor and the winding, through which the columns pass air-tight, so that the winding is immersed in air of normal pressure and temperature, while the rotor is inside a room of high temperature and pressure. Thus, the energy is transmitted by means of the magnetic core.

The shortcoming of the motors as per FIG. 1 is that, as a consequence of the magnetic flow which rounds the rotor, the magnetizing current increases. This shortcoming disappears, when such a motor replaces an assembly consisting of a motor of conventional construction, and an auxiliary voltage transformer, or a regulating transformer.

The rotor may rotate by a limited angle, driving a mobile contact-piece, until it makes contact with another fixed contact. When one of the phases is cut, i.e. when the revolving magnetic field disappears, the mobile contact returns to its initial position, under the influence of a directing force deriving from a spring, for instance, and the contact is cut off.

By cutting off the contact, we may—in the case of a phase being interrupted—stop the feeding of the stator winding, thus protecting the motor proper, consisting of the magnetic core 1, the winding 4, the first rotor 2 and the accompanying equipment. Still by means of the contact between the mobile and the fixed part, one may make sure that the motor proper turns in a single direction, when necessary.

This kind of protection shows advantages, by simplifying the construction.

I claim:

1. A three-phase electric motor, which comprises:

an elongated, laminated magnetic core having first and second portions disposed in longitudinally adjacent relation, the first portion including a pair of transversely spaced, elongated slots bounded by three parallel legs, the second portion including a circular aperture extending through all the laminations in the core in a direction normal thereto, said elongated slots being at least partially coextensive with the outer periphery of said circular aperture, the center of the aperture being substantially aligned with the intermediate one of the legs;

a plurality of coils individually wound on the three legs for connection to an external three-phase power source; and a rotor received in the circular aperture.

2. A motor as defined in claim 1, in which the core comprises:

first and second longitudinally adjacent yokes of different sizes, the larger yoke being of substantially rectangular shape and including the circular aperture and said elongated slots, the smaller yoke being generally E-shaped and including the three legs.

3. A motor as defined in claim 1, in which the core is formed from third and fourth longitudinally adjacent yokes of different sizes, the larger yoke being generally E-shaped and including the circular aperture and three sides of the respective slots which are at least partially coextensive with the outer periphery of said circular aperture, the smaller yoke being generally I-shaped and forming the periphery of the respective fourth sides of the slots.

4. A motor as defined in claim 1, in which the coils are individually wound around the portions of the legs most remote from the circular aperture.

References Cited

UNITED STATES PATENTS

| | | | |
|---|---|---|---|
| 2,713,646 | 7/1955 | Hammerstrom et al. | 310—259 |
| 2,981,856 | 4/1961 | Ludemann et al. | 310—190 |

MILTON O. HIRSHFIELD, *Primary Examiner.*

L. L. SMITH, *Assistant Examiner.*